Feb. 18, 1936.   J. G. GOODHUE   2,031,158
MACHINE FOR MAKING GRINDING WHEELS
Filed Dec. 31, 1931

Inventor
Julian G. Goodhue

Patented Feb. 18, 1936

2,031,158

UNITED STATES PATENT OFFICE 2,031,158

MACHINE FOR MAKING GRINDING WHEELS

Julian G. Goodhue, Evanston, Ill., assignor to Security Grinding Wheel Co., Chicago, Ill., a trust estate, as trustees Application December 31, 1931, Serial No. 584,151

22 Claims. (Cl. 154—1)

The invention relates to a machine for manufacturing grinding wheels which are comprised of an abrasive, an adhesive and a cord of fibrous material which is wound about an axis defining the axis of the wheel and is embedded in the mixture of abrasive and adhesive.

The invention has among its various objects the production of a machine in which one or more cords may be wound about the axis of the wheel and distributed longitudinally thereof in spaced relation and which has abrasive and adhesive simultaneously fed to the cords during the winding operation.

Another object of the invention is to provide a machine such as that just referred to with means whereby a balanced wheel is produced by applying a greater pressure to that portion of the periphery of the wheel which is greater in diameter than another portion of the wheel.

The invention also has as an object to provide a threading or cord distributing means which will distribute the cords longitudinally in opposite directions lengthwise of the axis of the wheel.

A further object of the invention is to provide means whereby a plurality of cords may be simultaneously wound in opposite directions during the winding operation.

A further object of the invention is to provide a machine such as that above referred to with means whereby wheels of different widths may be produced.

A further object of the invention is to provide means for agitating the abrasive and adhesive and to also in addition maintain same in a relatively cool condition.

Figure 1:
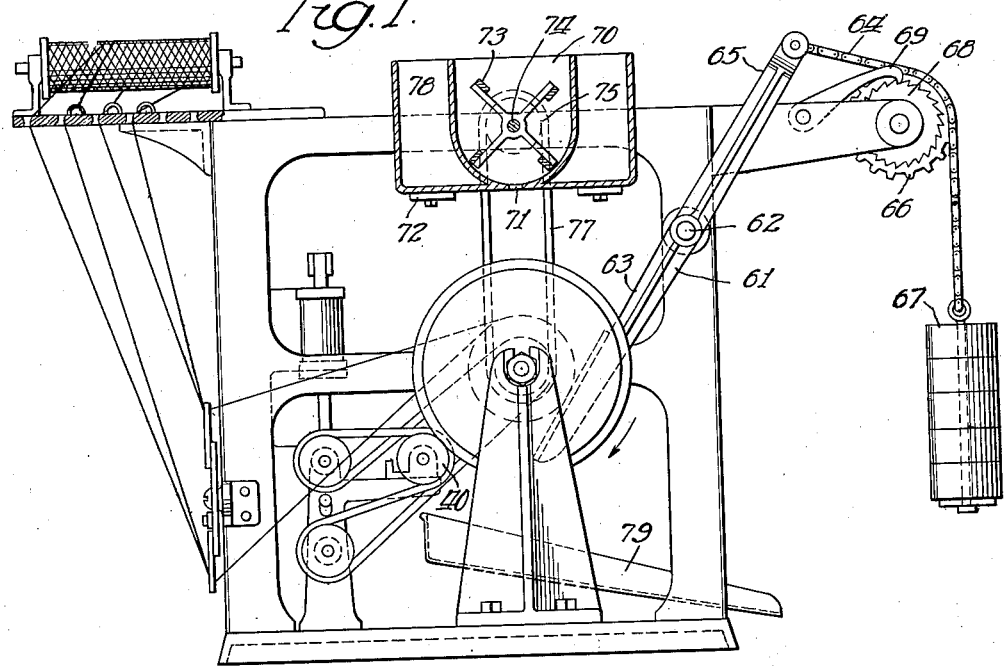
Figure 2:
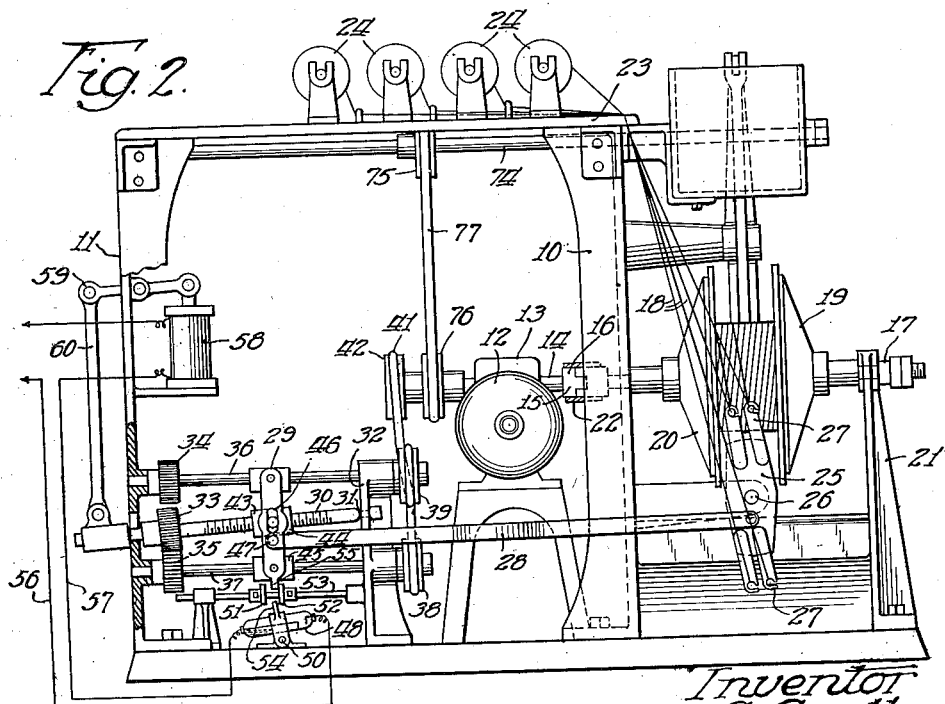

The invention has these and other objects, all of which will be explained in detail and more readily understood when read in conjunction with the accompanying drawing, in which Fig. 1 is a side view partly in section for the purpose of illustration; and Fig. 2 is a view looking at one end of the device shown in Fig. 1.

The machine contemplates the utilization of a frame comprised of the side frames 10 and 11 which provide means for supporting various elements of the structure. A motor 12 is employed which has a reduction gear located in the housing 13. A shaft 14 is connected for operation by the motor through the agency of the reduction gear. The latter may be of any desired character and therefore is not shown in detail.

The shaft 14 is provided with an element of a clutch 15 with which a clutch element 16 is designed to cooperate to produce a driving connection between the shaft 14 and a shaft 17, about the axis of which cords such as 18 are designed to be wound. Elements such as 19 and 20 are secured to the shaft 17. These elements, in the present instance, are in the form of discs which are secured to the shaft 17 and rotate therewith, it being understood that these discs 19 and 20 are adjusted to the width of the wheel to be fabricated.

A support 21 is provided for removably supporting one end of the shaft 17, the opposite end thereof being supported by the shaft 14, the elements of the clutch such as 15 and 16 being held against separation through the agency of a tubular element 22 which is slidable relatively to the clutch elements so as to effect a separable connection of the shafts 17 and 14.

A platform 23 is carried by the side frames 10 and 11 and this platform provides a support for the spools 24 from which the cords 18 are fed to a cord distributing element generally designated 25 which is automatically moved from one end of the space between the discs 19 and 20 to the opposite end and reverse. This distributor 25 is pivoted at 26 and has a plurality of cord guides 27 provided thereon through which the cords 18 are threaded and from which the cords are fed during the rotation of the shaft 17. A link 28 is connected to the distributor 25 and extends therefrom to the device 29 which forms an element of means for actuating the distributor 25 to cause its oscillation about the pivot 26.

The mechanism employed for causing operation of the element 29 and oscillation of the distributor 25 involves the use of a threaded oscillatory shaft 30, one end of which such as 31 is pivotally mounted in the frame 32. The opposite end is free to move in opposite directions so as to cause the gear 33 secured to the shaft 30 to alternately mesh with the gears 34 and 35, the latter of which are mounted upon shafts respectively designated 36 and 37. These shafts 36 and 37 have one end thereof mounted in the frame 32 and have the opposite end thereof mounted in the elements such as 11 of the main frame. Each of these shafts 36 and 37 are provided with a pulley designated 38 and 39 and an idler pulley 40 is provided. A belt 41 which is entrained over a pulley 42 mounted upon the shaft 14 travels over the pulleys 38 and 39 and the idler pulley 40.

From the above description of the mechanism just referred to, it is manifest that the shafts 36 and 37 are constantly rotated and that when the gear 33 is brought into mesh with either one or the other of the gears 34 and 35, rotation of the shaft 30 in opposite directions will be accomplished, depending upon which of the gears 34 and 35 the gear 33 is in engagement with.

The element 29 is slidably mounted upon the shafts 36 and 37 and has a threaded element 43 secured thereto. This element 43 is connected with bearings 44 and 45 mounted upon the shafts 36 and 37 through the agency of the member 46 and this member 46 is in turn connected as at 47 with the link 28.

A mercury switch 48 is employed and is pivoted at 50 and is designed to be tilted about its pivot 50 through the agency of the members 51 and 52 which are mounted upon the slidable rod 53. These members 51 and 52 may be adjusted along the rod 53 so as to space these members at different distances so as to compensate for wheels of different widths. The switch 48 has an element 54 extending therefrom which projects into the space between the members 51 and 52 and the member 46 also has a projection such as that designated 55 which also extends into said space.

It is evident that as the member 46 is actuated or moved along the threaded shaft 30, the projection 55 thereof will be caused to alternately engage one or the other of the members 51 and 52 and move the slide rod 53 causing one or the other of the members 51 and 52 to engage the element 54 of the mercury switch and cause it to be tilted to an open and closed position. The terminals of the switch 48 are connected through the agency of conductors respectively designated 56 and 57 to a source of current and a solenoid 58, which when the switch 48 is actuated to close the circuit, will be energized and cause the armature thereof to operate the arm 59 which is connected with the shaft 30 through the agency of a link 60. When the switch is moved in the opposite direction to open the circuit, the solenoid is deenergized and the gear 33 is allowed to mesh with the gear 35, causing a reversal of rotation of the shaft 30 which will cause the element 29, the link 28 and the distributing mechanism 25 to be moved in an opposite direction.

Manifestly, when the solenoid is energized, the gear 33 is brought into mesh with the gear 34 which will cause rotation of the shaft 30 in a direction opposite from that imparted thereto when the gear 33 is in mesh with the gear 35.

A pressure bar generally designated 61 is employed and is pivoted at 62. One end such as 63 is designed to enter the space between the discs 19 and 20 and is of a width substantially corresponding to the space between the discs to hold the mixture in contact with the windings and also apply pressure to the windings of the cord and the mixture of abrasive and adhesive. This pressure bar has a ratchet associated therewith which cooperates with the pressure bar to apply a different pressure on one portion of the wheel being fabricated relatively to another portion thereof. In other words, this pressure bar applies a lesser pressure to that portion of the wheel which is of a lesser radius than another portion thereof and thus will equally distribute the material throughout the circumference or periphery of the wheel and result in the production of a balanced wheel.

This pressure bar has a chain such as 64 secured to the end 65 thereof and this chain operates over a sprocket 66 and has the opposite end thereof provided with weights 67, or the equivalent, such as a spring connected therewith to supply a desired pressure upon the wheel being fabricated. A ratchet wheel 68 is secured to the sprocket 66 or the shaft thereof and a holding dog 69 cooperates with the ratchet 68. The teeth of the ratchet 68 are of a relatively small character so that the ratchet may be moved or rotated upon each minute change of diameter of the wheel being fabricated. The holding dog 69 cooperates with the teeth of the ratchet so that a prescribed resistance or pressure will be applied to the wheel for each increase of diameter of the wheel.

When the mixture is fed from the hopper 70 to the windings and between the lower portion of the pressure bar and the windings the pressure bar is gradually moved or adjusted a prescribed distance by this additional mixture or increase of diameter of the wheel, against the action of the weights 67 which correspondingly rotates the ratchet 68, allowing the pressure bar to adjust itself to compensate for this additional material.

When the amount of material fed to the windings is sufficient to move the pressure bar so that the ratchet is rotated a full tooth or more, the dog engages one of the teeth of the ratchet and prevents reverse rotation by the weights which hold the pressure bar in a prescribed position and temporarily releases the action of the weights upon the pressure bar. During this period, because of being biased in one direction, the pressure bar applies a certain pressure upon the wheel being built, due to the weight of the pressure bar. Naturally it will demand additional force to move the bar from this position and overcome the action of the weights which causes a different or greater pressure to be applied by the bar to any additional material fed between the discs 18 and 19, and the windings and pressure bar. Thus the pressure bar applies a different or adjustable pressure to the wheel being fabricated.

As before stated, a mixture of abrasive and adhesive is fed to the space between the plates or discs 19 and 20 during the winding of the cord about the axis of the wheel. To this end, a hopper 70 is employed and located directly above or in vertical alignment with the axis of the wheel being fabricated and is provided with a discharge port 71 and a valve 72. A means for agitating the mixture is employed. This means may include the agitators or paddles 73 mounted upon the shaft 74, the latter of which has a pulley 75 provided thereon which is connected with a pulley 76 provided upon the shaft 14 through the agency of a chain or belt 77.

From this it can be seen that when the motor 12 is actuated, the agitator also is actuated which will cause turbulence and proper mixture of the material fed to the cords being wound.

It has been found that certain mixtures of abrasive and adhesive operate best at certain temperatures and therefore a cooling chamber 78 is employed which surrounds the tank in which the agitator 73 operates and will contain a certain cooling agent to maintain the mixture at the proper temperature. A trough 79 is employed which will catch the excess material dropping from between the discs or plates 19 and 20.

From the foregoing description of the invention, it is manifest that a machine is produced whereby a grinding wheel may be fabricated which involves in its construction a mixture of abrasive and adhesive and cords of a fibrous material which are wound about the axis of the wheel.

It is further manifest that a means is provided for distributing the cords longitudinally of the axis of the wheel and that this distribution may be accomplished throughout certain prescribed limits longitudinally of the axis of the wheel and that the distance of distribution of the cords may be varied so that wheels of various widths may be produced.

It is further manifest that by employing a pressure bar such as 63 that the mixture of abrasive and adhesive will be distributed circumferentially of the wheel and result in producing a wheel which is of a balanced character.

Having thus described the invention, what I claim as new and desire to cover by Letters Patent is:

1. In a machine of the kind described, the combination of a shaft and means for rotating said shaft, elements between which a cord is adapted to be wound by said shaft, means for feeding material between said elements, and means for applying pressure to said cord and material, said last mentioned means including means for applying a prescribed pressure for each winding and maintaining said means in said last mentioned condition.

2. In a machine of the kind described, the combination of a shaft and means for rotating said shaft, elements between which a cord is adapted to be wound by said shaft, means for distributing said cord longitudinally of the axis of said shaft during rotation of said shaft, means for feeding material between said elements, and means for applying pressure to said cord and material.

3. In a machine of the kind described, the combination of a shaft and means for rotating said shaft, elements between which a cord is adapted to be wound by said shaft, means for simultaneously winding a plurality of cords longitudinally of the axis of said shaft, means for feeding material between said elements, and means for applying pressure to said cord and material.

4. In a machine of the kind described, the combination of a shaft and means for rotating said shaft, elements between which a cord is adapted to be wound by said shaft, means for causing simultaneous winding of a plurality of cords at opposite inclinations with respect to the axis of said shaft, means for feeding abrasive material between said elements, and means for applying pressure to said cord and material.

5. In a machine of the kind described, the combination of a shaft and means for rotating said shaft, elements between which a cord is adapted to be wound by said shaft, said elements being adapted for separable connection with said shaft, means for feeding material between said elements, and means for applying pressure to said cord and material.

6. In a machine of the kind described, the combination of a shaft and means for rotating said shaft, elements between which a cord is adapted to be wound about the axis of said shaft, means for feeding material between said elements, means for agitating said material, and means for distributing said cord longitudinally of the axis of said shaft.

7. In a machine of the kind described, the combination of a shaft and means for rotating said shaft, elements between which a cord is adapted to be wound about the axis of said shaft, means for feeding material between said elements, means for distributing said cord longitudinally of the axis of said shaft, said elements being adapted for separable connection with said shaft.

8. In a machine of the kind described, the combination of a shaft and means for rotating said shaft, elements between which a cord is adapted to be wound, said elements being separably connected with said shaft, guide means for said cord, said means being movable longitudinally of said shaft, and means for feeding material between said elements.

9. In a machine of the kind described, the combination of a shaft and means for rotating said shaft, elements between which a cord is adapted to be wound, said elements being separably connected with said shaft, guide means for said cord, means for oscillating said guide means, and means for feeding material between said elements.

10. In a machine of the kind described, the combination of a shaft and means for rotating said shaft, elements between which a cord is adapted to be wound, said elements being separably connected with said shaft, guide means for said cord, said means being movable longitudinally of said shaft, means for varying the distance of movement of said guide means, and means for feeding material between said elements.

11. In a machine of the kind described, the combination of a shaft and means for rotating said shaft, elements between which a cord is adapted to be wound, said elements being separably connected with said shaft, guide means for said cord, means for oscillating said guide means, means for varying the distance of movement of said guide means, and means for feeding material between said elements.

12. In a machine of the kind described, the combination of a shaft and means for rotating said shaft, elements between which a cord is adapted to be wound by said shaft, means for feeding material between said elements, and means for applying pressure to said cord and material, said last mentioned means including means for lessening said pressure upon certain portions of the element formed by said windings and material.

13. In a machine of the kind described, the combination of a shaft and means for rotating said shaft, elements between which a cord is adapted to be wound by said shaft, means for feeding material between said elements, and means for applying pressure to said cord and material, said last mentioned means including means for varying the pressure upon certain portions of the periphery of the element formed by said windings and material.

14. In a machine of the kind described, the combination of a shaft and means for rotating said shaft, elements between which a cord is adapted to be wound by said shaft, means for feeding material between said elements, means for applying pressure to said cord and material, said last mentioned means including means for applying a prescribed pressure for each winding, and means for cooling said material associated with said means for feeding material between said elements.

15. In a machine of the kind described, the combination of a shaft and means for rotating said shaft, elements between which a cord is adapted to be wound by said shaft, means for feeding material between said elements, means for applying pressure to said cord and material, said last mentioned means including means for applying a prescribed pressure for each winding, and means for maintaining said material at a desired temperature associated with said means for feeding material between said elements.

16. In a machine for fabricating a wheel comprised of a cord and material combined with said cord, the combination of a shaft around which said cord is wound, means for feeding material to said windings during said winding operation, and means for applying pressure to said combined cord and material during said winding operation, said last mentioned means providing means for applying a prescribed pressure to said cord and material for each uniform increase of diameter of combined cord and material, said means being movable upon the occurrence of inequalities of said diameter to a point corresponding to the greatest diameter and being maintained in said last mentioned position until said diameter is again equalized.

17. In a machine for fabricating a wheel comprised of a cord and material combined with said cord, the combination of a shaft around which said cord is wound, means for feeding material to said windings during said winding operation, and a pressure bar for applying pressure to said combined cord and material during said winding operation, said pressure bar providing means for applying a prescribed pressure to said cord and material for each uniform increase of diameter of combined cord and material, said pressure bar being movable upon the occurrence of inequalities of said diameter to a point corresponding to the greatest diameter and being maintained in said last mentioned position until said diameter is again equalized.

18. A machine for forming a grindstone body from fibrous material and an abrasive substance comprising a winding mechanism including pressure body shaping disks, a core mounted intermediate the disks, means for directing the fibrous material to said body as it is wound on said core, means for adjusting said directing means with respect to said body, means for delivering the abrasive substance to said body, and pressure means for impregnating and embedding said abrasive substance into the progressive surface of said body throughout its building up process.

19. A machine for forming a grindstone body from fibrous material and an abrasive substance comprising a thread-winding mechanism including pressure body shaping disks, a core intermediate the disks, comb means for directing a plurality of threads to said core, and means for effecting reciprocation of said comb to shiftingly distribute the threads from side to side of the body in alternate oppositely inclined directions relative to the axis of the body to present a predetermined interwoven pattern effect, means for delivering the abrasive to said body as it is being formed, and pressure means for impregnating and embedding the abrasive substance into said body during its building up process.

20. A machine for forming a grindstone from fibrous material and an abrasive substance, comprising a thread winding mechanism including adjustable pressure disks for shaping said body, means for delivering the abrasive substance to said body as it is being formed, and adjustable pressure means for continuously impregnating and embedding the abrasive substance into said body during its building up process.

21. A machine for forming a grindstone body of fibrous material and an abrasive substance, comprising a thread winding mechanism for winding said thread into a body, including pressure disks for shaping the body during the winding process, an adjustable pressure mechanism predeterminedly mounted with respect to said winding mechanism, a container adapted to contain abrasive and adhesive substances, means for mixing said substances in said container, said container being mounted above said winding mechanism and adapted to deliver by gravity said abrasive mixture to a predetermined point with respect to said body and pressure mechanism, said pressure mechanism adapted to continuously impregnate and embed the abrasive mixture in the progressive surface of said body during its building up process.

22. A machine for forming a grindstone body from a fibrous material and an abrasive substance comprising a thread-winding mechanism including pressure body shaping disks, a core mounted intermediate the disks, reciprocating means for shiftingly distributing the thread over the surface of the body being formed, means for varying the action of the reciprocating means in accordance with different width bodies, means for delivering the abrasive substance to said body as it is being formed, and pressure means for impregnating and embedding said abrasive into the progressive surface of said body throughout its building up process.

JULIAN G. GOODHUE.